3,804,895
PREPARATION OF CARBOXY ALKANOIC
ACIDS AND ESTERS
Arthur W. Schwab, Peoria, Ill., assignor to the United States of America as represented by the Secretary of Agriculture
No Drawing. Filed Jan. 21, 1972, Ser. No. 219,857
Int. Cl. C07c 55/02, 51/24, 69/34
U.S. Cl. 260—530 R                4 Claims

ABSTRACT OF THE DISCLOSURE

A method is disclosed for preparing carboxy alkanoic acids and esters by catalytic conversion of hydroformylated fatty acids and esters. Yields as high as 95 percent were obtained with a minimum of side reactions.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to a method of catalytically oxidizing the aldehydic moieties of hydroformylated fatty acids and esters to form dibasic acids and esters (i.e., carboxy alkanoic acids and esters) of the type represented by the following general formula:

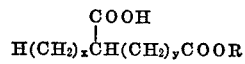

where R is either a hydrogen or an alkyl group. The values of $x$ and $y$ depend on the chain length, position of unsaturation, and amount of unsaturation of the fatty acid prior to hydroformylation; and method of hydroformylation.

The preparation of formylated fatty compounds by reacting unsaturated fatty acids or esters with carbon monoxide and hydrogen in the presence of a catalyst is well known in the prior art [Frankel et al., JAOCS 46 (3), 133–138 (1969)]. Oxidation of the formyl side chain has also been accomplished but usually by chemical means such as potassium permanganate, potassium dichromate, or alkaline hydroperoxide. Autoxidation of the formyl products would be more economical than chemical oxidation except for the persistent side reactions which reduce yields and result in mixtures which make recovery of the carboxy alkanoic acids and esters difficult.

Autoxidation of aldehydes is generally believed to proceed by a free radical chain mechanism. The rate of reaction of formyl fatty acids and esters with oxygen can be increased by the addition of known free radical initiators such as salts of cobalt, cerium, and manganese as determined by the increase in peroxide development. However, significant amounts of side products such as hydroxy and keto compounds are also produced with these catalysts.

I have now discovered a method for preparing carboxy alkanoic acids and esters with a minimum of side reactions which comprises reacting formyl acids and esters with oxygen in the presence of a catalytic amount of dissolved calcium salts or a mixture of calcium salts and manganese.

Carboxy alkanoic acids and esters prepared according to the instant invention are known to be useful as intermediates in preparation of polyamides used in leather finishing (U.S. 2,957,783); in adhesives, castings, and protective coatings (U.S. 3,062,773); and for the preparation of esters used as plasticizers in vinyl halide resins (U.S. 2,965,598).

DETAILED DESCRIPTION OF THE INVENTION

The preferred starting materials for the reaction are formyl alkanoic acids and esters of varying chain length and containing formyl groups at any point on the carbon chain. Products such as these have been prepared from fatty acid materials including soybean oil, olive oil, linseed oil, tall oil, cuttle fish oil, and many of the individual fatty acids contained in these oils (Frankel et al., supra).

For certain applications and laboratory purposes mixtures of carboxy alkanoic acids and esters containing the fewest possible number of positional isomers are desired. For these applications starting materials are used which consist essentially of equal portions of the 9 and 10 isomers of formylstearic acid or their corresponding esters [see E. N. Frankel, JAOCS 48(5): 248–253 (1971) for the method of preparation of the above starting materials].

The most important criterion for the catalyst is that it must be at least partially soluble in the reaction medium. Calcium naphthenate is preferred for oxidations involving formyl compounds having chain length of between $C_9$ to $C_{22}$, while calcium acetate is soluble in fatty acids and esters having chain length shorter than $C_9$.

The first step in the autoxidation of aldehydes is generally considered to be the formation of hydroperoxides. Dissolved metals such as iron, copper, manganese, cobalt, and cerium are known to increase the rate at which the peroxides develop. This is true for the specific case of autoxidations of formyl alkanoic acids and esters. Autoxidations of methyl formylstearate were performed in the presence of metal catalyst, monitored for formation of peroxides, and compared to a control autoxidation conducted without a catalyst. In the control reaction peroxide developed to a high of 40 milliequivalents (meq.) of peroxide per kilogram (kg.) of methyl formylstearate (MFS). Cobalt and cerium catalyst increased peroxide development to 290 meq./kg. MFS and 190 meq./kg. MFS, respectively. However, the calcium catalyst, instead of increasing peroxide formation, actually inhibited it. No significant amount of peroxide was formed. Despite the fact that calcium catalyst inhibits peroxide formation during autoxidation of formyl alkanoic esters, carboxy alkanoic esters were formed at a greater rate and with less byproduct formation with calcium catalysts than with any of the known free radical catalysts.

During the course of determining optimum catalyst conditions, it was discovered that a mixture of calcium and manganese salts catalyzed the autoxidation to an even greater extent than the calcium alone and produced only trace amounts of hydroxy or keto compound side products. In order to establish the extent of this synergistic effect, other catalyst mixtures were prepared. Calcium-cobalt, calcium-cerium, and calcium-ferrous naphthenate mixtures were used to catalyze the oxidation of methyl formylstearate. Formation of the carboxy compound approximated that of calcium alone but greatly increased amounts of side products were formed. Calcium salts alone and the calcium-manganese salt mixture are effective catalysts for both formyl acids and their corresponding esters.

It is shown in the examples that a large range of catalyst concentration can be used without significantly affecting the results of the reaction. In autoxidizing methyl formylstearate calcium naphthenate was used at concentrations of from 0.05 percent to about 0.5 percent. All references to catalyst concentrations herein will be to percent metal ions based on weight of starting material.

The addition of only 0.05 percent manganese naphthenate to the reaction mixture containing 0.5 percent calcium naphthenate was sufficient to achieve the synergistic effect described above.

Reaction parameters of time, temperature, and oxygen volume are also not critical. Although 20° C. (room temperature) is the preferred temperature, the reaction proceeds at essentially the same rate at temperatures ranging from 0° to 50° C. The reaction is operable at even higher temperatures, but the formation of side products becomes unacceptable. Lower temperatures were not attempted. Oxygen can be introduced in several ways. Reaction is slow when just left open to the atmosphere, unless vigorously stirred. It is faster when air is drawn through the reaction mixture by means of a vacuum or bubbled through under pressure. The preferred method is to bubble air through the reaction media at an excessive rate (i.e., 18 to 20 l./min.), although much slower rates were used without significantly affecting the results.

In laboratory procedure the reaction was commonly allowed to proceed for 24 hours. However, the data in the examples shows that when a calcium catalyst was used as much as 90 percent of the starting material had been used up in 8 hours. When the calcium-manganese mixture was used, 98 percent of the starting material was consumed in 4 hours.

One rather important preference in procedure is the use of acetone or acetic acid as a solvent for the oxidation reaction of formyl alkanoic acids. An air oxidation of formylstearic acid with 0.5 percent calcium naphthenate at 55° C. without solvent yielded only 64 percent carboxystearic acid. The stearic acid yield was 9.2 percent, and 10.6 percent of a mixture of hydroxy- and ketostearic acids was formed. At reaction temperatures below 40° C. the catalyst is less soluble in the acid. When the reaction is conducted in a solvent ratio as little as 1:4 (solvent:acid by volume) at lower temperature (e.g., 20° C.), calcium naphthenate remains soluble, fewer side products are formed, and yields are greater. When solvents are used it is preferred that the naphthenate catalyst be dissolved in the formyl fatty acids before adding the solvent. This helps maintain the solution of catalyst.

The final step of the invention as claimed can be accomplished by many known methods. In applications where the side products would not be a hinderance, the addition of sufficient methanol to precipitate the catalyst followed by removal of the solvent is a sufficient recovery process. Simple temperature crystallization techniques give a relatively pure carboxy product. However, when a product that contains 95–99 percent carboxy alkanoic acids or esters is desired the preferred recovery process is urea crystallization. Other purification methods such as distillation or column chromatography also result essentially pure product but are difficult when large quantities are involved.

The following examples are intended only as illustrative embodiments and should not limit the scope of the invention.

EXAMPLE 1

Materials.—Methyl 9(10)-formylstearate starting material was prepared by the method of E. N. Frankel, supra, and contains 92.5 percent methyl 9(10)-formylstearate, 4.0 percent carboxystearate, and 3.5 percent stearate and oleate. The purity of both starting material and reaction products was determined by gas-liquid chromatography (GLC) and is expressed as mole percent. The metal catalysts (see Table 1, infra) are all naphthenate salts with the possible exception of the zirconium salt which is described by its supplier only as being a fat-soluble salt. Acid values were determined according to the "Official and Tentative Methods of the American Oil Chemists' Society," Third Edition, AOCS, Chicago, Illinois, 1970, Te 1a–64.

Autoxidation.—Methyl 9(10)-formylstearate (500 g., 92 percent) and Ca naphthenate (0.5 percent Ca ions based on weight of formyl ester) were placed in a 2000-ml. graduated cylinder equipped with a flat fritted glass ebulator (5.5 cm. diam.) and an external cooling coil and bath to maintain the temperature at 20° C. A constriction at the 1500-ml. mark held a small inverted funnel to control excessive splashing and to hold the ebulator tube in position. Compressed air (18 to 20 l./min.) was passed through a column of Drierite and then through the reaction mixture for 24 hours. Crude yield was 560 g. Analysis by GLC showed 84.1 percent methyl 9(10)-carboxystearate, 3.6 percent oleate+stearate, 3.6 percent hydroxy- +ketostearate, and 4.9 percent formylstearate.

Recovery.—A portion of crude autoxidized product (196 g.) was treated with urea (100 g.) and methanol (200 ml.) to remove straight-chain impurities. After recrystallization of the urea adduct the methanol solutions were combined, poured into water, and extracted with ether. The ether solution was washed with water, stripped to dryness and the product recrystallized from n-hexane (300 ml.) at −20° C. After filtration 100 ml. of n-hexane was removed and a second crop of crystals was obtained. The methyl 9(10)-carboxystearate obtained was 99 percent pure. (Neutral equivalent: 345, calc., 342.).

EXAMPLE 2

Samples of methyl 9(10)-formylstearate (25 g.) and metal naphthenate catalysts (0.5 percent metal based on weight of formyl ester) were charged into a 100-ml. graduated cylinder immersed in a 20° C. (+1° C.) water bath. Air measured by a wet test meter (flow rate: 20 l./min.) was dried through Drierite and then introduced into the reaction mixture through a fritted glass sparged tube. Samples were analyzed periodically by GLC, neutral equivalent, and peroxide values. The reactions were allowed to proceed for 24 hours after which the products were recovered as in Example 1 (see Table 1 for analysis).

TABLE 1

| Catalyst, 0.5% | Time, hours | Carboxy-stearate | Formyl-stearate | Stearate plus oleate | Keto- plus hydroxy-stearate | Other [a] | Acid value, percent carboxystearate |
|---|---|---|---|---|---|---|---|
| Control (no catalyst) | 8 | 71.7 | 17.5 | 5.4 | 4.7 | 0.7 | 69.8 |
|  | 24 | 87.2 | 8.9 | 2.2 | 1.3 | 0.4 | 77.6 |
| Ca | 8 | 75.8 | 10.5 | 4.4 | 3.6 | 5.7 | 86.5 |
|  | 24 | 91.6 | 3.8 | 3.8 | 0.7 | 0.1 | 87.2 |
| Pb | 2 | 61.9 | 26.7 | 6.0 | 3.8 | 1.3 | 61.1 |
|  | 4 | 76.9 | 6.0 | 6.2 | 8.6 | 2.3 | 76.7 |
|  | 24 | 79.9 | 2.6 | 5.6 | 10.0 | 1.1 | 81.2 |
| Fe | 2 | 48.6 | 34.8 | 8.8 | 4.3 | 1.3 | 54.6 |
|  | 4 | 65.7 | 20.0 | 6.2 | 5.2 | 2.3 | 63.0 |
|  | 24 | 79.9 | 2.6 | 5.6 | 10.0 | 1.3 | 77.4 |
| Zr | 2 | 43.1 | 44.6 | 8.5 | 3.1 | 0.7 | 61.0 |
|  | 4 | 57.5 | 25.8 | 8.3 | 5.5 | 2.9 | 67.0 |
|  | 24 | 76.0 | 8.1 | 2.7 | 6.3 | 6.9 | 75.1 |
| Mn | 2 | 32.7 | 55.4 | 6.1 | 2.5 | 3.3 | 67.3 |
|  | 4 | 74.3 | 7.4 | 10.5 | 5.9 | 1.9 |  |
|  | 24 | 79.4 | None | 9.5 | 9.3 | 0.8 | 70.5 |
| Co | 24 | 65.3 | None | 18.9 | 14.4 | 1.4 | 63.4 |
| Ce | 2 | 35.6 | 39.6 | 15.4 | 7.7 | 0.7 | 39.6 |
|  | 4 | 52.3 | 14.8 | 19.4 | 13.1 | 0.4 |  |
|  | 24 | 58.1 | 1.0 | 17.2 | 23.7 | None | 58.1 |

[a] Includes: epoxystearate, diformylstearate, and unidentified material.

EXAMPLE 3

Methyl formylstearate was oxidized and the products recovered in the same manner as in Example 2. The catalysts used in this example were mixtures of calcium naphthenates with cobalt, ferrous, or cerium naphthenates as shown in Table 2.

TABLE 2

| Catalyst | Time, hours | Composition (GLC), percent | | | |
|---|---|---|---|---|---|
| | | Carboxy-stearate | Formyl-stearate | Keto- plus hydroxy-stearate | Stearate |
| Control (no catalyst) | 2 | 29.4 | 62.4 | 0.4 | 7.6 |
| | 4 | 49.6 | 39.5 | 2.8 | 7.3 |
| 0.05% Ca | 2 | 37.5 | 54.3 | | 7.5 |
| | 4 | 63.9 | 28.1 | 1.1 | 6.0 |
| 0.5% Ca | 2 | 38.5 | 48.7 | 2.2 | 6.1 |
| | 4 | 75.3 | 16.5 | 1.9 | 3.5 |
| 0.5% Ca, 0.05% Co | 2 | 67.9 | 9.8 | 3.8 | 18.3 |
| | 4 | 76.5 | 0.3 | 6.5 | 15.4 |
| 0.5% Ca, 0.005% Co | 2 | 57.3 | 20.0 | 5.8 | 16.3 |
| | 4 | 71.5 | 1.2 | 9.3 | 17.4 |
| 0.05% Ca, 0.05% Fe | 2 | 39.9 | 46.8 | 3.0 | 8.8 |
| | 4 | 76.9 | 3.1 | 10.3 | 9.0 |
| 0.5% Ca, 0.05% Ce | 6 | 84.2 | 3.2 | 4.8 | 4.3 |

EXAMPLE 4

9(10)-formylstearic acid prepared by the method of E. N. Frankel, supra (750 g., 85 percent) and calcium naphthenate (74 ml., 0.5 percent Ca based on weight of formylstearic acid) were placed in a 5-1. 3-neck round-bottom flask and 750 ml. of acetone were added. A Teflon coated magnet was placed in the bottom of the flask for stirring and the apparatus was placed in 20° C. water bath. A Dry Ice cold finger was inserted in one of the flask necks to keep the acetone in the flask; a thermometer was inserted in a second neck; and a round fritted glass ebulator was placed in the center neck. Compressed air (18 to 20 l./min.) was passed through a column of Drierite and then through the reaction mixture for 24 hours. Crude yield was 877 g. Analysis by GLC showed 86 percent carboxystearic acid.

The reaction products were recovered by urea crystallization as described in Example 2. The resulting 9(10)-carboxystearic acid was 95 percent pure.

EXAMPLE 5

9(10)-formylstearic acid (25 g., 93.5 percent formylstearic, 2.3 percent carboxystearic, 3.3 percent stearic plus oleic, 0.9 percent unidentified) was oxidized in a 250-ml. flask with 100 ml. of acetone in the same manner as described in Example 4. Various naphthenates and mixtures of calcium naphthenate with either cerium of manganese naphthenate were used as catalysts. See Table 3 for results.

TABLE 3

| Catalyst | Time, hours | Composition (GLC), percent | | | | |
|---|---|---|---|---|---|---|
| | | Carboxy-stearic | Formyl-stearic | Stearic plus oleic | Keto- plus hydroxy-stearic | Other a |
| Control (no catalyst) | 24 | 7.2 | 89.2 | 3.6 | | |
| 0.5% Ca | 4 | 43.4 | 53.3 | 3.3 | | |
| | 24 | 94.4 | 3.5 | 2.1 | | |
| 0.5% Cu | 4 | 27.5 | 69.7 | 2.8 | Trace | Trace |
| | 24 | 82.8 | 3.8 | 3.8 | 25 | 7.1 |
| 0.5% Co | 4 | 79.3 | 0.5 | 4.9 | 8.8 | 6.5 |
| 0.5% Fe | 4 | 82.8 | 7.9 | 5.2 | 2.2 | 1.9 |
| 0.05% Mn | 3 | 85.0 | 1.3 | 3.5 | 9.9 | 0.3 |
| | 24 | 86.7 | Trace | 1.6 | 9.7 | Trace |
| 0.5% Ce | 1 | 52.9 | 34.1 | 4.8 | 7.0 | 1.2 |
| | 7 | 80.6 | 4.9 | 5.4 | 8.2 | 0.9 |
| 0.05% Mn, 0.5% Ca | 4 | 94.1 | 2.5 | 3.3 | Trace | 0.1 |
| | 7 | 95.3 | 0.8 | 2.5 | 0.8 | 0.6 |
| 0.05% Ce, 0.5% Ca | 4 | 77.9 | 17.9 | 2.9 | 0.9 | 0.4 |
| | 6 | 78.5 | 14.1 | 3.1 | 2.7 | 1.6 | a Includes: epoxystearic, diformylstearic, and unidentified material.

EXAMPLE 6

A sample (8 g.) of crude reaction products from hydroformylation of methyl oleate (E. N. Frankel, supra) containing 0.5 percent rhodium catalyst was autoxidized in the presence of 0.5 percent calcium ions for 19 hours in the manner described in claim 2 and analyzed by GLC, Table 4.

TABLE 4

| Sample | Composition (GLC), percent | | | | |
|---|---|---|---|---|---|
| | Carboxy-stearate | Formyl-stearate | Keto- plus hydroxy-stearate | Stearate plus oleate | Other |
| Starting material | | 74.4 | | 92.4 | 13.2 |
| Oxidized products | 73.0 | 5.0 | 2.7 | 7.8 | 11.5 |

EXAMPLE 7

Example 6 was repeated with a crude hydroformylated methyl oleate starting material which contained 2 percent rhodium catalyst. After the oxidation reaction had proceeded for 19 hours, the products were analyzed by GLC, Table 5.

TABLE 5

| Sample | Composition (GLC), percent | | | | |
|---|---|---|---|---|---|
| | Carboxy-stearate | Formyl-stearate | Keto-plus hydroxy-stearate | Stearate plus oleate | Other |
| Starting material | | 72.1 | | 9.4 | 18.5 |
| Oxidized products | 72.8 | 2.9 | 4.9 | 8.6 | 10.8 |

I claim:
1. A method of preparing carboxy alkanoic acids and esters which comprises reacting formyl fatty acids or esters having chain lengths of from $C_9$ to $C_{22}$ with oxygen in the presence of a catalytic amount of a composition consisting essentially of calcium naphthenate or a 10:1 equivalent mixture of calcium and manganese naphthenates, and recovering the resulting carboxy alkanoic acids or esters.
2. The method of claim 1 in which the formyl fatty acids or esters have carbon chain length of from $C_9$ to $C_{22}$.
3. The method of claim 1 in which the formyl fatty acids or esters are 9(10)-formylstearic acid or esters.
4. The method of claim 1 in which the formyl fatty acids are dissolved in acetone or acetic acid prior to reacting with oxygen.

References Cited

UNITED STATES PATENTS

| | | | |
|---|---|---|---|
| 2,287,437 | 6/1942 | Schulz | 260—530 R |
| 2,959,613 | 11/1960 | Whitfield | 260—530 RX |

OTHER REFERENCES

Tsyskouskii et al., CA, vol. 43 (1949), 3186h.

LORRAINE A. WEINBERGER, Primary Examiner

R. D. KELLY, Assistant Examiner

U.S. Cl. X.R.

260—485 R